(12) United States Patent
Kuo et al.

(10) Patent No.: US 9,174,209 B2
(45) Date of Patent: Nov. 3, 2015

(54) HYDROGEN STORAGE COMPOSITES AND METHODS FOR MANUFACTURING THE SAME

(75) Inventors: Chia-Hung Kuo, Tainan (TW); Chien-Yun Huang, Hsinchu County (TW); Chun-Ju Huang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 471 days.

(21) Appl. No.: 13/553,712

(22) Filed: Jul. 19, 2012

(65) Prior Publication Data
US 2013/0161559 A1    Jun. 27, 2013

(30) Foreign Application Priority Data
Dec. 27, 2011   (TW) .............................. 100148816 A

(51) Int. Cl.
| | | |
|---|---|---|
| *B01J 37/34* | (2006.01) | |
| *B01J 23/26* | (2006.01) | |
| *B01J 23/42* | (2006.01) | |
| *C01B 3/00* | (2006.01) | |
| *B05D 7/24* | (2006.01) | |
| *B01J 23/44* | (2006.01) | |
| *B01J 23/48* | (2006.01) | |
| *B01J 23/72* | (2006.01) | |
| *B01J 23/755* | (2006.01) | |
| *B01J 35/00* | (2006.01) | |
| *B01J 37/00* | (2006.01) | |
| *B01J 23/62* | (2006.01) | |

(52) U.S. Cl.
CPC .............. *B01J 37/348* (2013.01); *B01J 23/26* (2013.01); *B01J 23/42* (2013.01); *B01J 23/44* (2013.01); *B01J 23/48* (2013.01); *B01J 23/72* (2013.01); *B01J 23/755* (2013.01); *B01J 35/006* (2013.01); *B01J 35/0013* (2013.01); *B01J 37/0036* (2013.01); *C01B 3/0031* (2013.01); *C01B 3/0078* (2013.01); *B01J 23/626* (2013.01); *Y02E 60/327* (2013.01)

(58) Field of Classification Search
None
See application file for complete search history.

(56) References Cited

U.S. PATENT DOCUMENTS

| | | |
|---|---|---|
| 5,536,586 A | 7/1996 | Tsushio et al. |
| 7,250,386 B2 | 7/2007 | Ovshinsky |
| 2005/0126663 A1 | 6/2005 | Fetcenko et al. |
| 2010/0019196 A1 | 1/2010 | Yang et al. |

(Continued)

FOREIGN PATENT DOCUMENTS

| | | |
|---|---|---|
| CN | 156598 | 1/2005 |
| CN | 101289161 | 10/2008 |

(Continued)

OTHER PUBLICATIONS

Billur Sakintuna et al., "Metal Hydride Materials or Solid Hydrogen Storage: A Review," International Journal of Hydrogen Eneregy, Jan. 2007, pp. 1121-1140, vol. 32, Elsevier, US.
Lifeng Wang et al., "New Sorbents for Hydrogen Storage by Hydrogen Spillover—A Review," Energy & Enviromental Science, Jun. 2008, pp. 268-279, The Royal Society of Chemistry, US.
Michael U. Niemann et al., "Nanomaterials for Hydrogen Storage Applications: A Review," Journal of Nanomaterials, Sep. 2008, pp. 1-9, vol. 2008, Hindawi Publishing Corporation, US.

(Continued)

*Primary Examiner* — Joseph D Anthony

(57) ABSTRACT

Disclosed is a method of forming a hydrogen storage composite, including uniformly covering catalyst particles on the surface of a support to form a hybrid catalyst, and embedding the hybrid catalyst on the surface of a hydrogen storage material to form a hydrogen storage composite. Furthermore, the disclosed also provides a method for manufacturing the same.

6 Claims, 7 Drawing Sheets

(56) References Cited

U.S. PATENT DOCUMENTS

| | | |
|---|---|---|
| 2010/0240522 A1 | 9/2010 | Inui et al. |
| 2011/0020214 A1* | 1/2011 | Naeemi et al. ............. 423/648.1 |
| 2013/0084474 A1* | 4/2013 | Mills ................................ 429/9 |
| 2013/0142726 A1* | 6/2013 | Biniwale et al. .............. 423/651 |
| 2014/0072836 A1* | 3/2014 | Mills ................................ 429/8 |

FOREIGN PATENT DOCUMENTS

| | | |
|---|---|---|
| CN | 101671788 | 3/2010 |
| CN | 101862686 | 10/2010 |
| CN | 101863454 | 10/2010 |
| TW | 200513546 | 4/2005 |
| TW | 200618863 | 6/2006 |

OTHER PUBLICATIONS

Nobuko Hanada et al., "Catalytic Effect of Nanoparticle 3d-Transition Metals on Hydrogen Storage Properties in Magnesium Hydride MgH2 Prepared by Mechanical Milling," J. Phys. Chem. B, Mar. 2005, pp. 7188-7194, vol. 109, No. 15, American Chemical Society, US.

Vincent Berube et al., "Suze Effects on teh Hydrogen Storag Properties of Nanostructured Metal Hydrides: A Review," International Journal of Energy Research, Mar. 2007, pp. 637-663, vol. 31, John Wiley & Sons, Ltd. US.

Taiwan Patent Office, Office Action, Patent Application Serial No. 100148816, Dec. 9, 2013, Taiwan.

China Patent Office, Office Action, Patent Application Serial No. 201110449945.8, Jun. 12, 2014, China.

* cited by examiner

HYDROGEN STORAGE COMPOSITES AND METHODS FOR MANUFACTURING THE SAME

CROSS REFERENCE TO RELATED APPLICATIONS

The present application is based on, and claims priority from, Taiwan Application Serial Number 100148816, filed on Dec. 27, 2011, the disclosure of which is hereby incorporated by reference herein in its entirety.

TECHNICAL FIELD

The technical field relates to hydrogen storage materials, and in particular relates to catalyst manners thereof.

BACKGROUND

The critical points for hydrogen economy being a clean and powerful solution to satisfying the global energy requirements, is low-cost and stable storage and transportation of hydrogen. The storages of hydrogen gas in high pressure vessels or liquefied cryogenic hydrogen gas has disadvantages such as low volumetric capacities, safety problems for transport applications, high energy consumption, and high maintenance cost. As such, metal or alloy for hydrogen storage is the most potential way. Metals and alloys form metal hydrides with hydrogen leading to solid-state storage under moderate temperature and pressure that gives them the important safety advantage over the compressed gas and liquid storage methods.

The alloy having a high hydrogen storage amount such as magnesium-based alloy is not practicable due to poor kinetics of absorption/desorption and high hydrogen desorption temperature (e.g. usually higher than 300° C.). Accordingly, a hydrogen storage composite which may absorb and release hydrogen at a lower temperature to be applied in hydrogen energy is called-for.

SUMMARY

One embodiment of the disclosure provides a hydrogen storage composite, comprising: a hybrid catalyst including catalyst particles uniformly covering the surface of a support; and a hydrogen storage material, wherein the hybrid catalyst is embedded on the surface of the hydrogen storage material.

One embodiment of the disclosure provides a method for manufacturing a hydrogen storage composite, comprising: uniformly covering catalyst particles on the surface of a support to form a hybrid catalyst; and embedding the hybrid catalyst on the surface of a hydrogen storage material to form a hydrogen storage composite.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
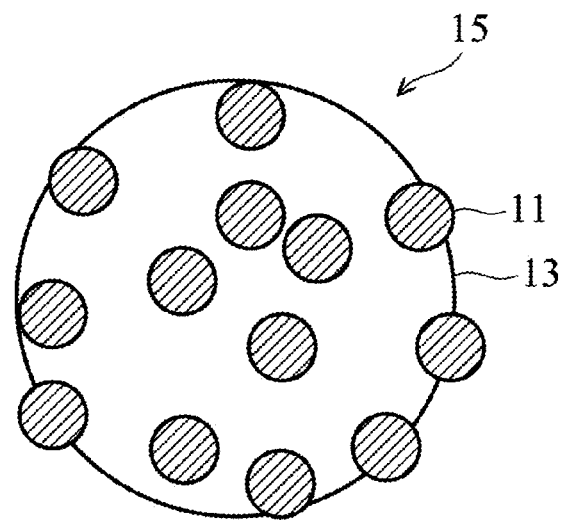
FIG. 1 shows a FIG. 1 shows a hybrid catalyst in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The hydrogen storage composite of the disclosure is formed as follows. Firstly, the catalyst particles 11 are uniformly dispersed on the surface of a support 13 to obtain a hybrid catalyst 15, as shown in FIG. 1. In one embodiment, the catalyst particles 11 can be silver, palladium, nickel, chromium, gold, platinum, or copper. The catalyst particles 11 have a size of 10 nm to 100 nm. Catalyst particles 11 having an overly large size have lower activity. Catalyst particles 11 having an overly small size cannot be stably formed during synthesis. In one embodiment, the support 13 can be aluminum oxides, titanium oxides, niobium oxides, cobalt oxides, or porous carbon materials. The support 13 has a size of 100 nm to 1 μm. A support 13 having an overly large size will lead to coarsening of metal catalyst particles, such that the catalysis activity of the catalyst particles will decrease. A support 13 having an overly small size cannot make the metal catalyst particles to be easily covered thereon. In one embodiment, the catalyst particles 11 and the support 13 have a weight ratio of 1:100 to 1:10. Catalyst particles having an overly high ratio are easily aggregated so that dispersion on the support surface is difficult. Catalyst particles having an overly low ratio have a poor catalysis activity.

The step of uniformly covering the catalyst particles 11 on the support 13 to form the hybrid catalyst 15 can be an electroless plating process. For example, a chemical plating solution of a catalyst salt can be firstly prepared, and a support having the sensitized surface can be impregnated into the chemical plating solution. A reducing agent is then added to the chemical plating solution, such that the reactant is chemically reduced to a metal catalyst covering the support surface. The amount and size of the catalyst covering the support can be modified by reducing agent concentration, pH value, reaction period, and reaction temperature, to obtain the desired hybrid catalyst. The sensitizer for sensitizing the support surface can be $SnCl_2$. The reactant can be a compound (e.g. halide or complex) of silver, palladium, nickel, chromium, gold, platinum, or copper. The reducing agent can be glucose, sodium phosphinate, or hydrazine. The reducing agent has a concentration of 0.05M to 0.5M. A chemical reducing agent having an overly high concentration will rapidly form the metal catalyst particles, thereby aggregating or enlarging particles. A chemical reducing agent having an overly low concentration cannot efficiently chemically reduce the reactant, thereby decreasing the yield of metal catalysts. The electroless plating is performed for a period of 5 minutes of 30 minutes. An overly long electroless plating period may form excess metal catalyst particles, thereby easily aggregating or enlarging particles. An overly long electroless plating period cannot form sufficient amounts of the metal catalyst particles, thereby deteriorating the catalysis activity. The electroless plating is performed at a temperature of 15° C. to 75° C. An overly high electroless plating temperature will form excess metal catalyst particles due to rapid reactions. An overly low electroless plating temperature will make it difficult for the metal catalyst particles to be synthesized because of slow reaction kinetics. In one embodiment, an acidic $SnCl_2$ solution is adopted to sensitize the alumina support, wherein the $Sn^{2+}$ ions are adsorbed on the support surface. The sensitized alumina support is added into a Tollens' reagent composed of NaOH, $NH_4OH$, and $AgNO_3$, such that the $Sn^{2+}$ ions are oxidized to $Sn^{4+}$ ions and the $Ag^+$ ions are chemically reduced to Ag metal. Thereafter, a chemical reducing agent containing glucose ($C_6H_{12}O_6$) is added into the Tollens' reagent, such that more $Ag^+$ ions are chemically reduced to an Ag metal covering the alumina support surface. The ions can be chemically reduced to nano-scaled metal particles dispersed on the support surface by the electroless plating process, thereby preventing the nano-scaled catalysts from aggregation due to high temperature treatments. The catalyst uniformly dispersed on the support surface may keep a high specific surface area to increase the reaction activity.

Figure 2:
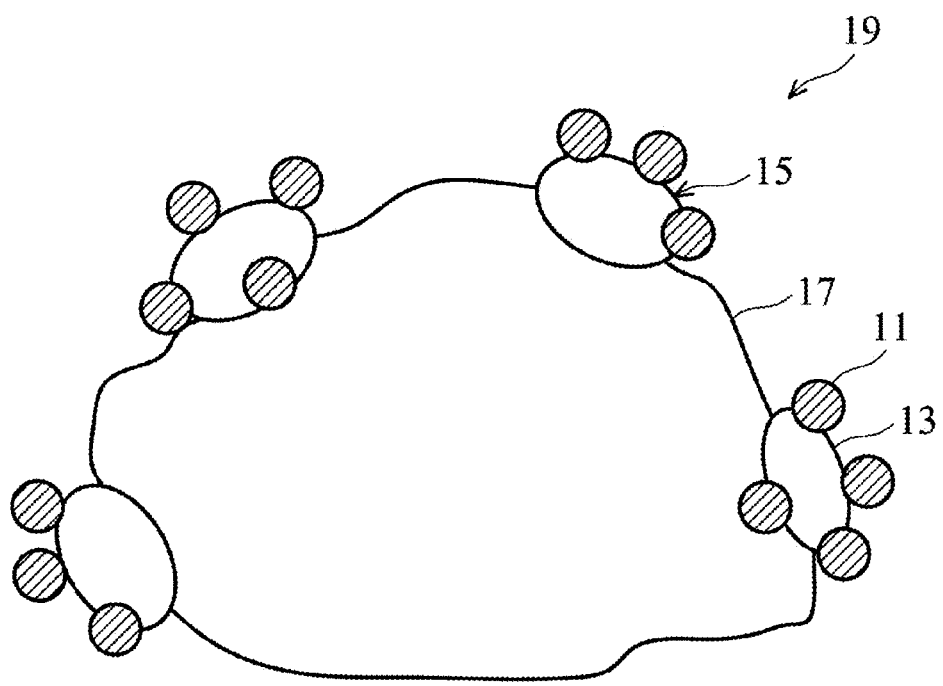
FIG. 2 shows a hydrogen storage composite in one embodiment of the disclosure.

Subsequently, the hybrid catalyst 15 is embedded on a surface of the hydrogen storage material 17 to complete a hydrogen storage composite 19, as shown in FIG. 2. The hydrogen storage material 17 can be magnesium, magnesium hydride, or magnesium-based alloy such as $Mg_{1-x}A_x$, wherein A is Li, Ca, Ti, V, Cr, Mn, Fe, Co, Ni, Cu, Zn, Al, Y, Zr, Nb, Mo, In, Sn, Si, B, C, or Be, and $0<x\leq0.05$. In one embodiment, the hybrid catalyst 15 and the hydrogen storage material 17 have a weight ratio of 1:100 to 1:10. A hybrid catalyst 15 having an overly high ratio will occupy excess weight of the total system, thereby decrease the weight ratio of hydrogen storage. A hybrid catalyst 15 having an overly low ratio cannot have a sufficient catalysis activity for storing and releasing hydrogen.

The step of embedding the hybrid catalyst 15 on the surface of the hydrogen storage material 17 to complete the hydrogen storage composite 19 can be a high energy ball milling process. For example, the hybrid catalyst 15 and the hydrogen storage material 17 can be put into a jar, and then ball-milled under argon to form the hydrogen storage composite 19. The milling media can be tungsten carbide or stainless steel. The media has a diameter of 1 mm to 5 mm. An overly small ball medium will result in a lower milling energy and a poorer embedding efficiency. An overly large ball medium will easily form dead corners between the media and the milling jar, in which a part of the powder cannot be impacted by the media to be embedded with each other. The media and the powder (the hybrid catalyst 15 and the hydrogen storage material 17) have a weight ratio of 10:1 to 50:1. Powder having an overly high weight ratio will result in a poorer milling efficiency and insufficient embedding area. Powder having an overly low ratio will get more contaminants due to the wear debris of ball media under a milling process. The ball milling methods can be performed by planetary rotation, attrition, or vibration for 0.25 hours to 1.5 hours. An overly short milling period may result in an insufficient embedding area. An overly long ball milling period may cause the metal catalyst to be peeled off the support surface and formed alloys with the hydrogen storage material. The mechanical force of the ball milling may directly embed the hybrid catalyst 15 on the surface of the hydrogen storage material 17. As such, the activity of the catalyst may promote the desorption of the hydrogen storage material 17 at a lower temperature. The catalyst particles 11 pre-covered on the support 13 surface not only uniformly disperses the catalyst particles 11, but also forms protection interface. This interface may suppress the alloying reaction between the catalyst particles 11 and the hydrogen storage materials 17 during the high energy ball milling process. In addition, rigid nano-scaled ceramic powder can be selected as the support 13 to help impaction during the ball-milling process, such that the hydrogen storage composite 19 may have more grain boundaries and defects to facilitate hydrogen atom diffusion under absorption or desorption. When the hybrid catalyst 15 and the surface of the hydrogen storage material 17 have a solid-state bonding therebetween, a phase boundary derived from the solid-state bonding may serve as a hydrogen diffusion path. As a result, the storing and releasing of hydrogen may have a lower activation energy barrier.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout

EXAMPLES

Example 1

Figure 3A:
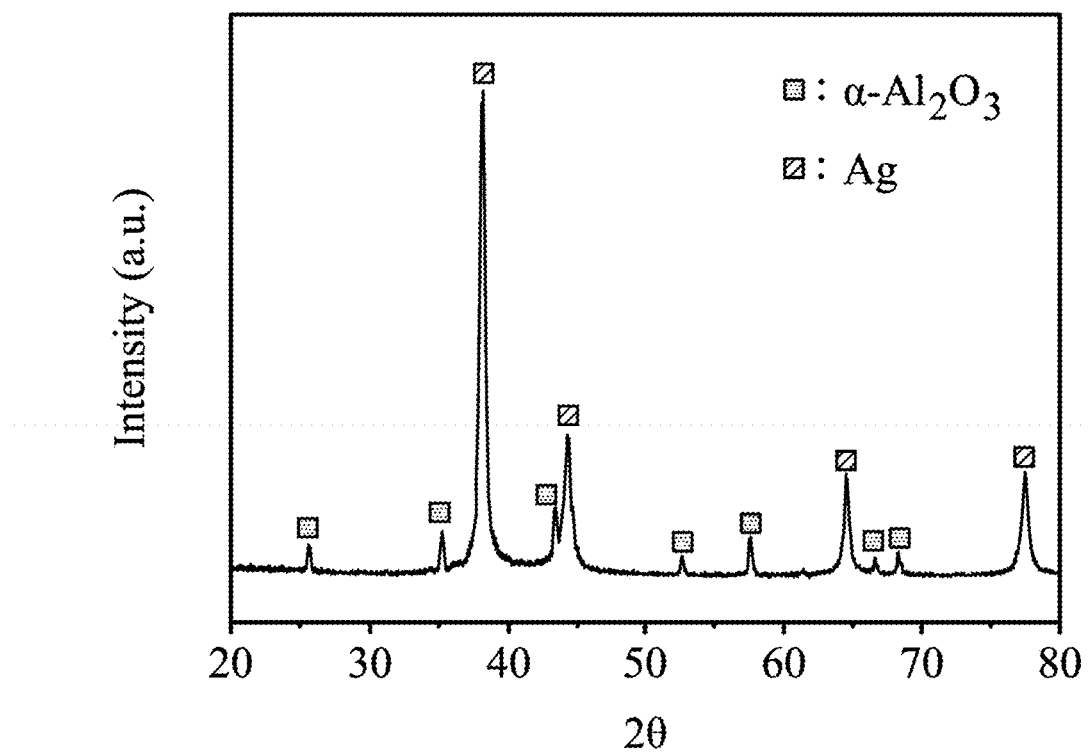
FIG. 3A shows an X-ray diffraction spectrum of a hybrid catalyst Ag/α-$Al_2O_3$ in one Example of the disclosure.
Figure 3B:
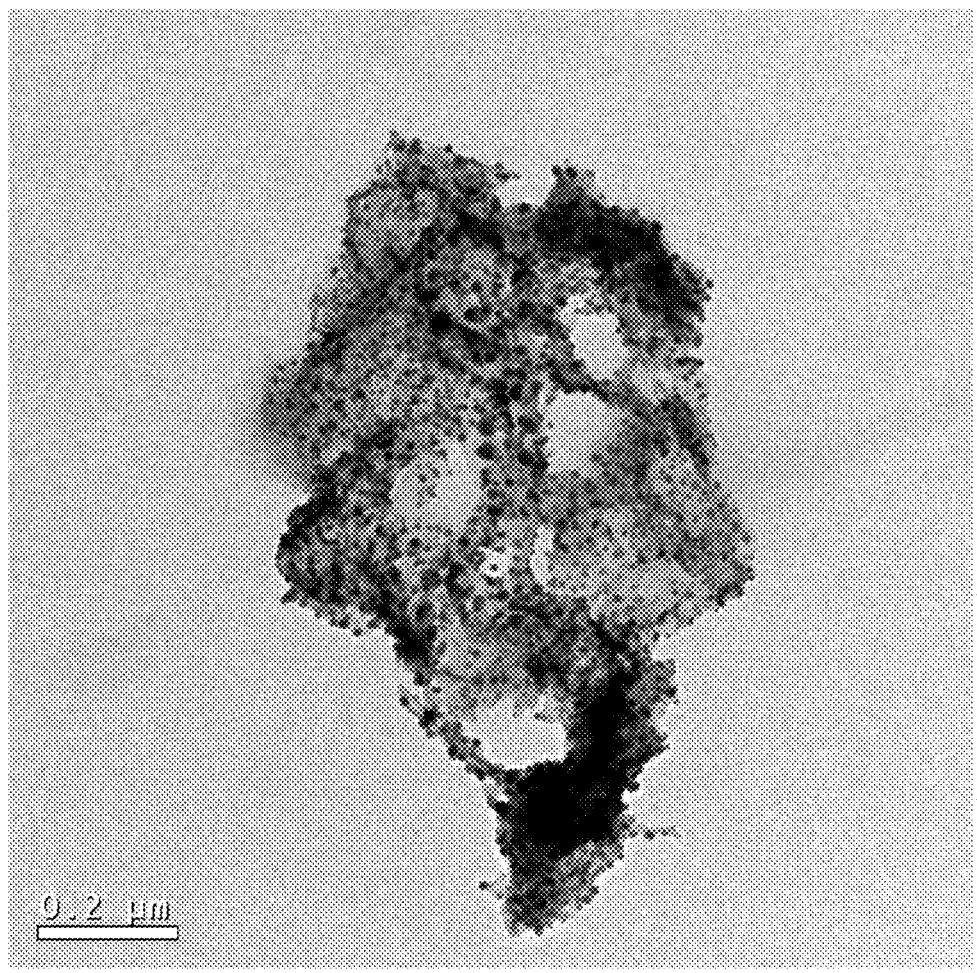
FIG. 3B shows a TEM image of the hybrid catalyst Ag/α-$Al_2O_3$ in one Example of the disclosure.

$\alpha$-$Al_2O_3$ powder was sensitized. A sensitization agent was prepared as follows. 0.4 g of $SnCl_2$ was dissolved and hydrolyzed in 34 mL of de-ionized water to form white precipitation. 3 mL of 1N HCl solution was then added into the $SnCl_2$ solution, such that the solution was totally clear. As such, the sensitization agent was obtained. 2 g of $\alpha$-$Al_2O_3$ powder (TM-DAR, commercially available from Daimei Telecom Eng. Co.) was impregnated into the sensitization agent and stirred at room temperature for 5 minutes, such that the $Sn^{2+}$ ions were adsorbed on the $\alpha$-$Al_2O_3$ powder surface. Thereafter, the suspension of the sensitized $\alpha$-$Al_2O_3$ powder was centrifuged to remove a liquid of the suspension for obtaining the sensitized $\alpha$-$Al_2O_3$ powder. 30 mL of a 0.9N NaOH solution, 35 mL of a 2N $NH_4OH$ solution, and 30 mL of 0.3N $AgNO_3$ were mixed to prepare a Tollens' reagent. The sensitized $\alpha$-$Al_2O_3$ powder was impregnated in the Tollens' reagent, and a solution of a chemical reducing agent containing $C_6H_{12}O_6$ was then added into the Tollens' reagent. The silver ions are chemically reduced by the $Sn^{2+}$ ions on the $\alpha$-$Al_2O_3$ powder surface to be adsorbed on the $\alpha$-$Al_2O_3$ powder surface, wherein the solution containing $C_6H_{12}O_6$ reinforce the chemical reduction of the silver ions. The chemical reduction was performed for 5 minutes and then centrifuged to collect a powder of a hybrid catalyst Ag/$\alpha$-$Al_2O_3$. The hybrid catalyst Ag/$\alpha$-$Al_2O_3$ had an X-ray diffraction spectrum as shown in FIG. 3A and a TEM image as shown in FIG. 3B.

Figure 4:
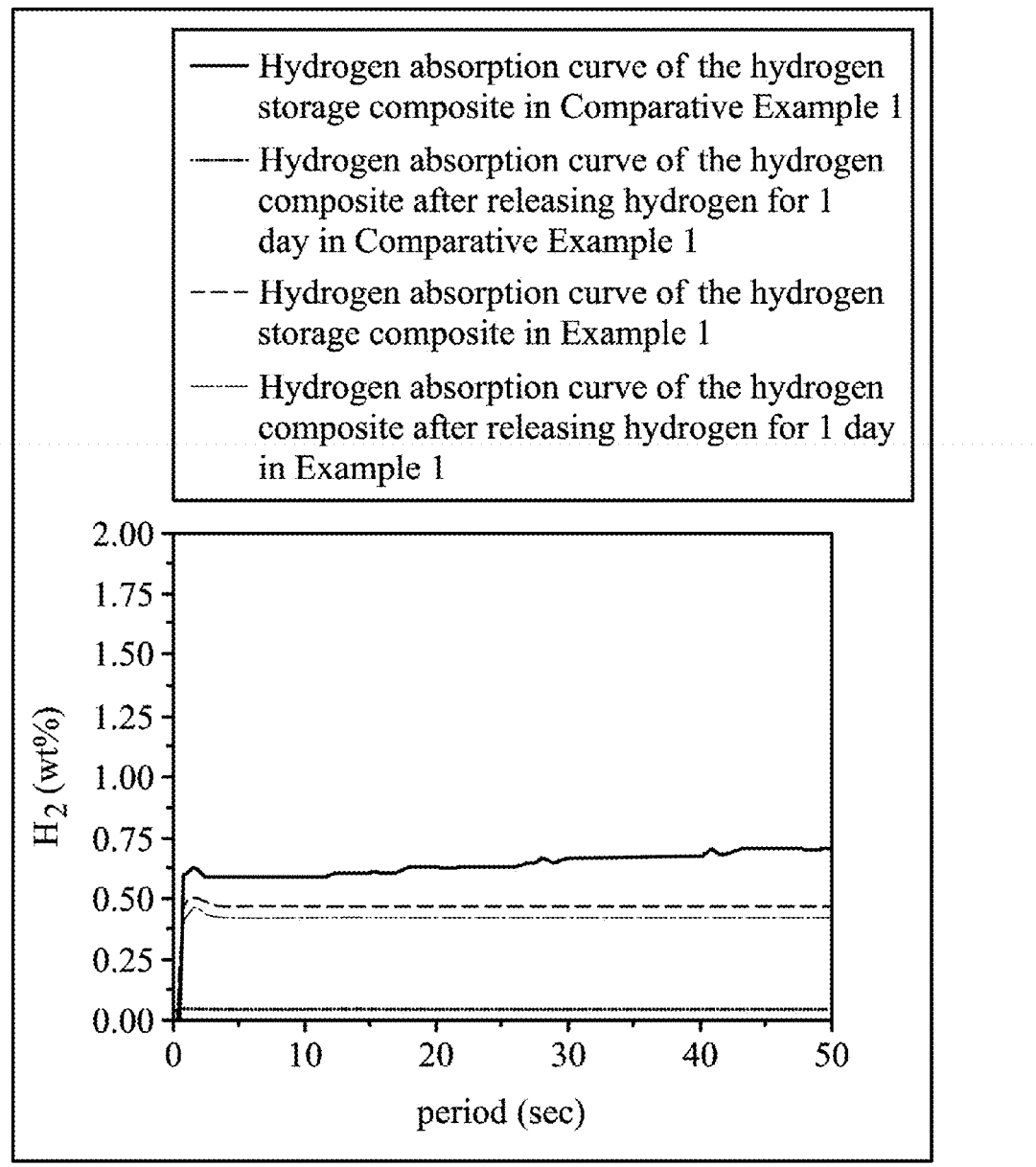
FIG. 4 shows hydrogen absorption and desorption curves of catalysts in one Example and one Comparative Example of the disclosure.

The hybrid catalyst $\alpha$-$Al_2O_3$/Ag was embedded onto a surface of magnesium hydride (hydrogen storage material) by a mechanical force. 92 parts by weight of the magnesium hydride and 8 parts by weight of the hybrid catalyst Ag/$\alpha$-$Al_2O_3$ were mixed to form a powder mixture. Thereafter, 32 parts by weight of the powder mixture and 1 part by weight of tungsten carbide media were filled into a milling jar, and argon was then inflated into the milling jar. The milling jar was put on a vibration milling machine (8000M, commercially available from SPEX CertiPrep®, Inc.) to be ball-milled for 30 minutes, thereby obtaining a hydrogen storage composite by embedding the hybrid catalyst α-Ag/Al$_2$O$_3$ onto the magnesium hydride. The hydrogen storage composite had hydrogen absorption/release curves at 140° C. as shown in FIG. 4. The hydrogen absorption and desorption were measured by a Sievert system. The hydrogen storage material was put into a sealed vessel with a constant volume. The pressure in the vessel was measured during the inflation/deflation of hydrogen to calculate the hydrogen storage amount of the materials. The hydrogen absorption was performed under a hydrogen pressure of 20 atm, and the hydrogen desorption was performed under a hydrogen pressure of less than 1 atm. Because the Sievert system set up by ourselves can only measure the hydrogen absorption amount, the hydrogen desorption amount was indirectly determined as follows. After a first hydrogen absorption process, the hydrogen storage material was put under a pressure of less than 1 atm for 1 day to completely release hydrogen, and then a second hydrogen absorption process was performed. A second hydrogen absorption curve was used to determine the hydrogen desorption amount of the materials.

Figure 5A:
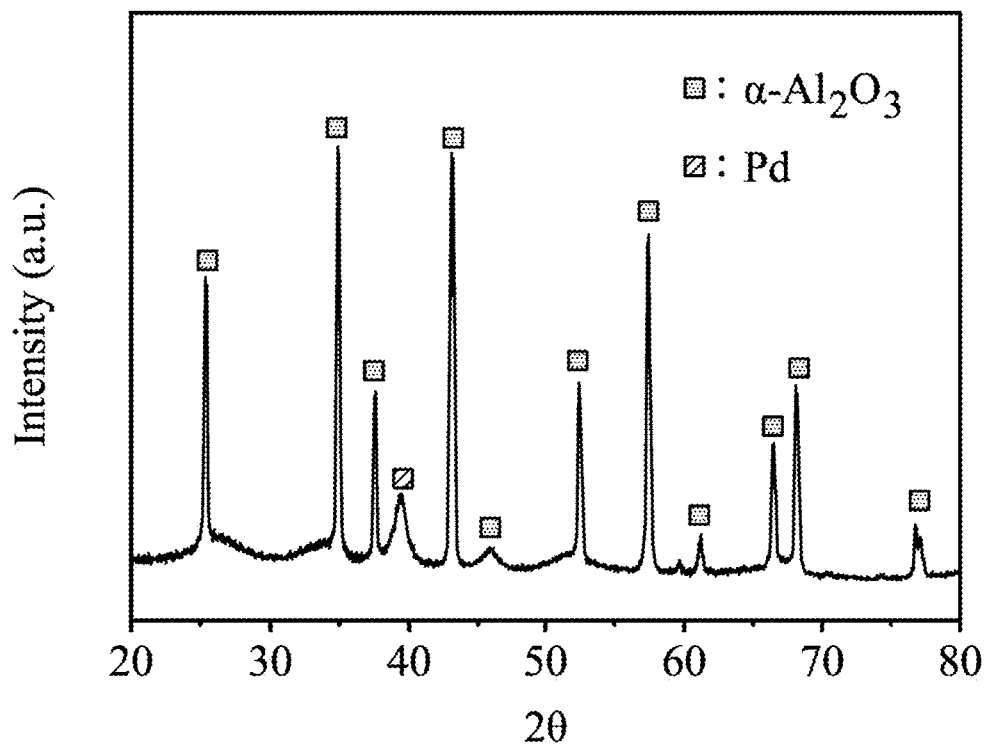
FIG. 5A shows an X-ray diffraction spectrum of a hybrid catalyst Pd/α-$Al_2O_3$ in one Example of the disclosure.
Figure 5B:
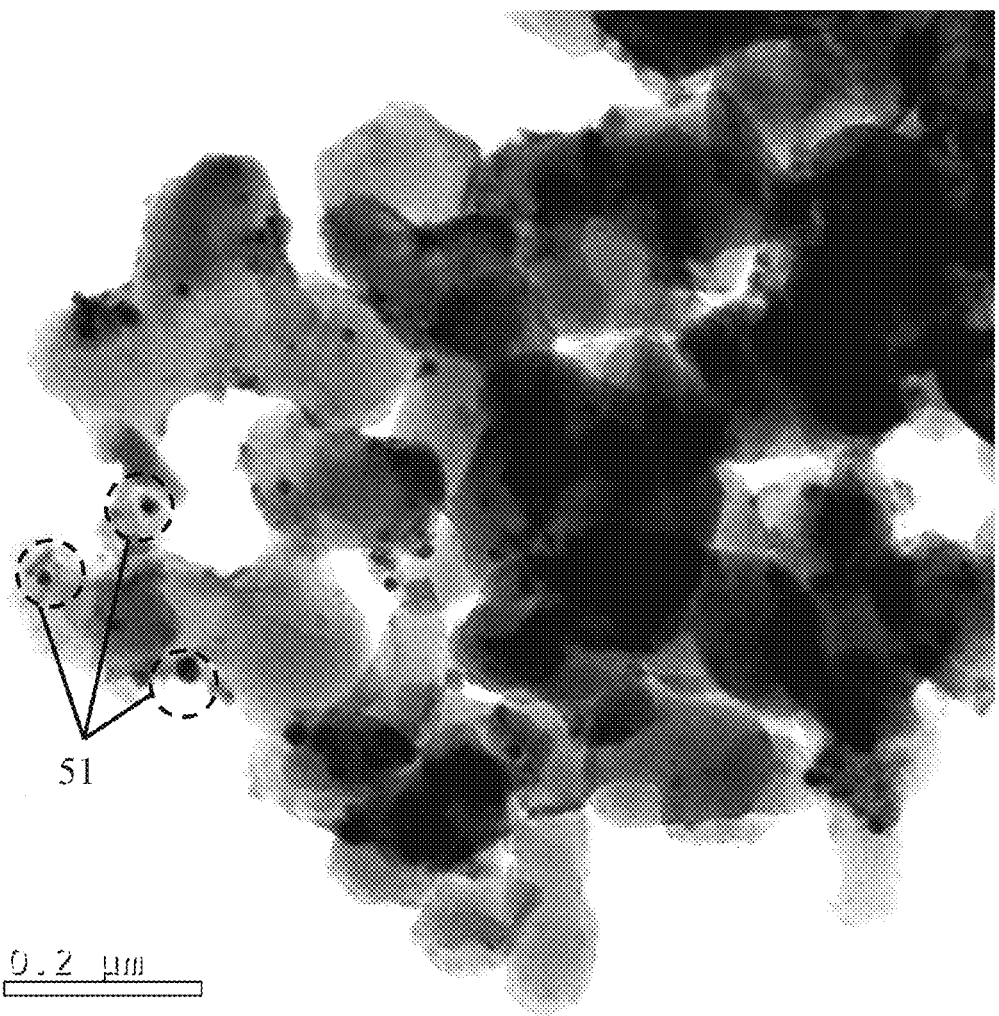
FIG. 5B shows a TEM image of the hybrid catalyst Pd/α-$Al_2O_3$ in one Example of the disclosure.

Example 2

α-Al$_2$O$_3$ powder was sensitized. A sensitization agent was prepared as follows. 5 g of SnCl$_2$ was dissolved in 7.5 mL of 37% HCl solution, and then diluted to 50 mL by de-ionized water to obtain the sensitization agent. 2 g of α-Al$_2$O$_3$ powder (TM-DAR, commercially available from Daimei Telecom Eng. Co.) was impregnated into the sensitization agent and stirred at room temperature for 5 minutes, such that the Sn$^{2+}$ ions were adsorbed on the α-Al$_2$O$_3$ powder surface. Thereafter, the suspension of the sensitized α-Al$_2$O$_3$ powder was centrifuged to remove a liquid of the suspension for obtaining the sensitized α-Al$_2$O$_3$ powder. 1 g of PdCl$_2$ was dissolved in 30 mL of 37% HCl solution, and then diluted to 100 mL by de-ionized water to obtain a PdCl$_2$ solution. The sensitized α-Al$_2$O$_3$ powder was impregnated in 45 mL of the PdCl$_2$ solution. The palladium ions are chemically reduced by the Sn$^{2+}$ ions on the α-Al$_2$O$_3$ powder surface to be adsorbed on the α-Al$_2$O$_3$ powder surface. The chemical reduction was performed for 5 minutes and then centrifuged to collect a powder of hybrid catalyst Pd/α-Al$_2$O$_3$. The hybrid catalyst Pd/α-Al$_2$O$_3$ had an X-ray diffraction spectrum as shown in FIG. 5A and a TEM image as shown in FIG. 5B. In the dotted circles 51 of FIG. 5B, the dark parts are palladium metal formed by chemical reduction.

Figure 6:
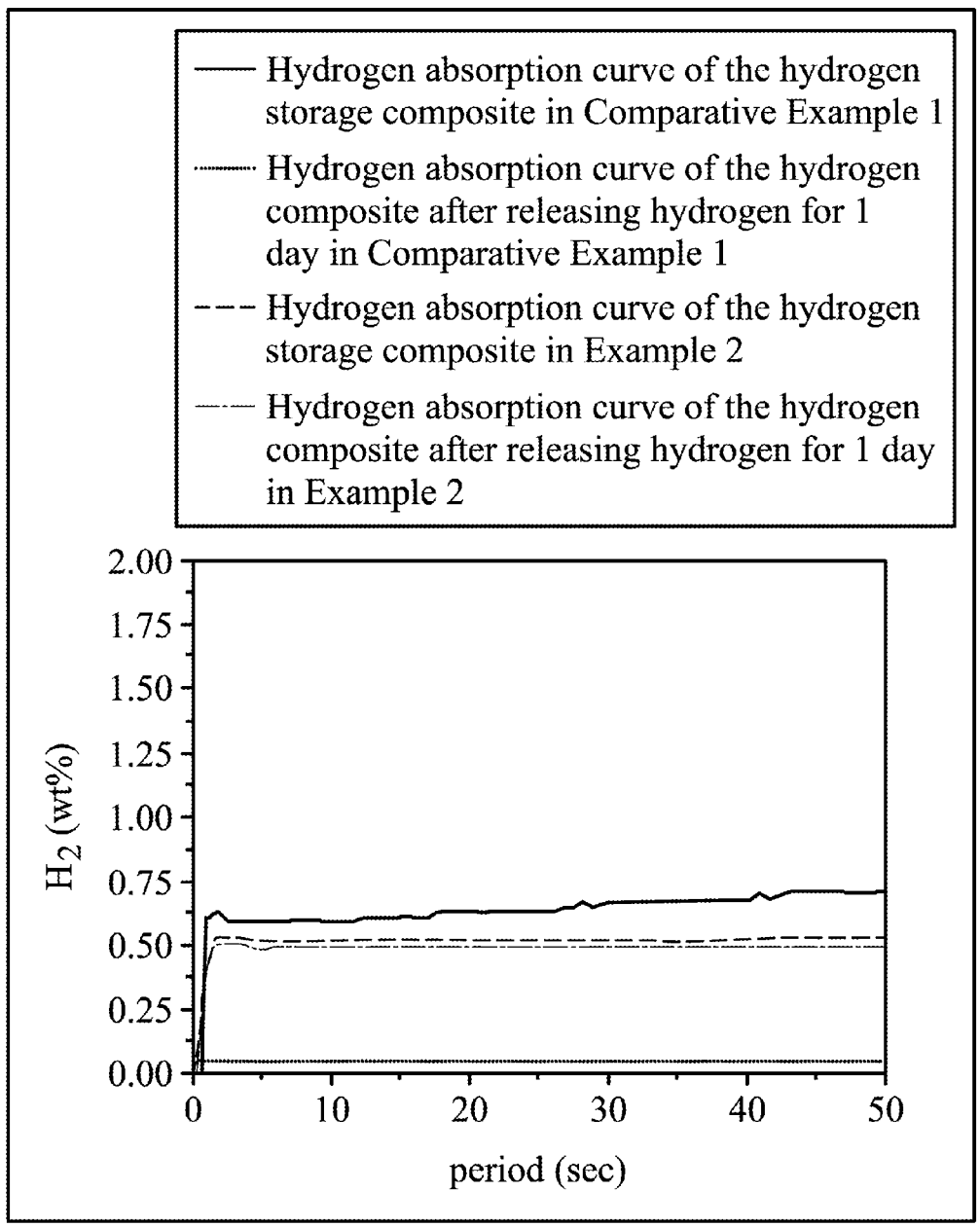
FIG. 6 shows hydrogen absorption and desorption curves of catalysts in one Example and one Comparative Example of the disclosure.

The hybrid catalyst Pd/α-Al$_2$O$_3$/Pd was embedded onto a surface of magnesium hydride (hydrogen storage material) by a mechanical force. 92 parts by weight of the magnesium hydride and 8 parts by weight of the hybrid catalyst Pd/α-Al$_2$O$_3$ were mixed to form a powder mixture. Thereafter, 32 parts by weight of the powder mixture and 1 part by weight of tungsten carbide media were filled into a milling jar, and argon was then inflated into the milling jar. The milling jar was put on a vibration milling machine (8000M, commercially available from SPEX CertiPrep®, Inc.) to be ball-milled for 30 minutes, thereby obtaining a hydrogen storage composite by embedding the hybrid catalyst α-Pd/Al$_2$O$_3$ onto the magnesium hydride. The hydrogen storage composite had hydrogen absorption/desorption curves at 140° C. as shown in FIG. 6. The hydrogen absorption and release were measured by Sievert system. The hydrogen storage material was put into a sealed vessel of a constant volume. The pressure in the vessel was measured during the inflation/deflation of hydrogen to calculate the hydrogen storage amount of the hydrogen storage material. The hydrogen absorption was performed under a hydrogen pressure of 20 atm, and the hydrogen desorption was performed under a hydrogen pressure of less than 1 atm. After a first hydrogen absorption process, the hydrogen storage material was put under a pressure of less than 1 atm for 1 day to completely release hydrogen, and then a second hydrogen absorption process was performed. A second hydrogen absorption curve was used to determine the hydrogen desorption amount of the materials.

Comparative Example 1

100 parts by weigh of magnesium hydride had hydrogen absorption/desorption curves at 140° C. as shown in FIGS. 4 and 6. The magnesium hydride without catalyst added therein almost could not release hydrogen at 140° C. On the other hand, the magnesium hydride having the hybrid catalyst embedded on its surface had a stably hydrogen desorption amount during a long period. The hydrogen absorption and desorption were measured by Sievert system. The hydrogen storage material was put into a sealed vessel of a constant volume. The pressure in the vessel was measured during the inflation/deflation of hydrogen to calculate the hydrogen storage amount of the materials. The hydrogen absorption was performed under a hydrogen pressure of 20 atm, and the hydrogen release was performed under a hydrogen pressure of less than 1 atm. After a first hydrogen absorption process, the hydrogen storage material was put under a pressure of less than 1 atm for 1 day to completely release hydrogen, and then a second hydrogen absorption process was performed. A second hydrogen absorption curve was used to determine the hydrogen release amount of the materials.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A hydrogen storage composite, comprising:
   a hybrid catalyst including catalyst particles uniformly covering the surface of a support, wherein the support comprises aluminum oxides, titanium oxides, niobium oxides, or cobalt oxides; and
   a hydrogen storage material,
   wherein the hybrid catalyst is embedded on the surface of the hydrogen storage material.

2. The hydrogen storage composite as claimed in claim 1, wherein the catalyst particles comprise silver, palladium, nickel, chromium, gold, platinum, or copper, and the catalyst particles have a size of 10 nm to 100 nm.

3. The hydrogen storage composite as claimed in claim 1, wherein the support has a size of 100 nm to 1 μm.

4. The hydrogen storage composite as claimed in claim 1, wherein the catalyst particles and the support of the hybrid catalyst have a weight ratio of 1:100 to 1:10.

5. The hydrogen storage composite as claimed in claim 1, wherein the hydrogen storage material comprises magnesium, magnesium hydride, or magnesium-based alloys.

6. The hydrogen storage composite as claimed in claim 1, wherein the hybrid catalyst and the hydrogen storage material have a weight ratio of 1:100 to 1:10.

* * * * *